United States Patent [19]

Kimber et al.

[11] Patent Number: 5,047,774

[45] Date of Patent: Sep. 10, 1991

[54] RADIO FREQUENCY TRANSMISSION AND RECEPTION SYSTEM

[75] Inventors: Ian D. Kimber, Bracknell; Stephen J. Roome, West Drayton, both of England

[73] Assignee: Thorn EMI plc, London, England

[21] Appl. No.: 426,283

[22] Filed: Oct. 25, 1989

[30] Foreign Application Priority Data

Oct. 25, 1988 [GB] United Kingdom ................ 8824968

[51] Int. Cl.$^5$ ........................... G01S 7/38; G01S 7/40
[52] U.S. Cl. ...................................... 342/15; 342/174
[58] Field of Search ................... 342/15, 51, 187, 173, 342/174

[56] References Cited

U.S. PATENT DOCUMENTS

| | | | |
|---|---|---|---|
| 2,952,015 | 9/1960 | Eakin | 342/174 |
| 3,113,268 | 12/1963 | Horak | 342/15 |
| 3,624,652 | 11/1971 | Haeff | 342/15 |
| 4,743,905 | 5/1988 | Wiegand | 342/15 |

Primary Examiner—Gilberto Barrón, Jr.
Attorney, Agent, or Firm—Fleit, Jacobson, Cohn, Price, Holman & Stern

[57] ABSTRACT

A radio frequency transmission and reception system, for use as an active decoy, includes a receiver 10, a transmitter 12 and a signal generator 20 for providing wideband noise signals for transmission during the interpulse period of pulsed signals transmitted by the transmitter 12. A feedback circuit 21, including an adaptive transversal filter 23 combines signals for transmission with output signals from the receiver to adaptively modify the wideband signals in the signals for transmission so as to render the receiver 10 substantially insensitive to received signals which are derived from the transmitter.

6 Claims, 1 Drawing Sheet

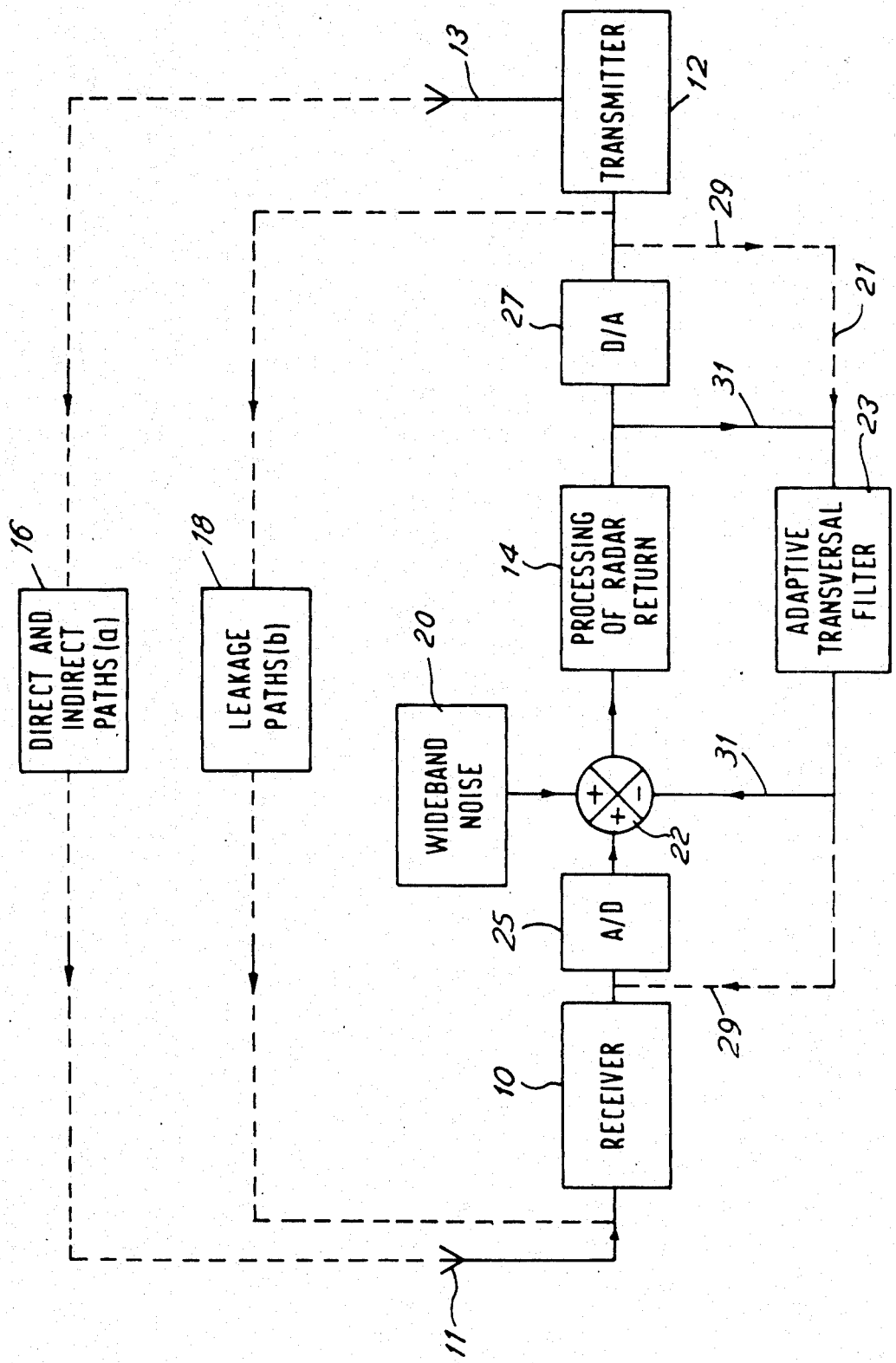

RADIO FREQUENCY TRANSMISSION AND RECEPTION SYSTEM

This invention relates to a radio frequency transmission and reception system and it relates particularly, though not exclusively, to a radio frequency repeater having application, for example, as an active decoy for a radar.

An active decoy includes a receiver arranged to receive radio frequency pulses from a radar and a transmitter arranged to transmit substantially identical pulses in the direction of the radar thereby to simulate reflection at a real target. An active decoy of that kind suffers from the problem of self-interference, in that the receiver may also be receptive of a portion of each transmitted pulse due to direct or indirect transmission from the transmitter or to leakage currents occurring within the system circuits. These unwanted signals can be problematical since they tend to blind the receiver to genuine signals from a remote radar.

In the case of a radio repeater for communications it is sometimes possible to introduce a frequency shift into the transmitted or received signals thereby to distinguish these signals. Clearly, though, that option is not available in the case of an active decoy.

Accordingly the present invention provides a radio frequency transmission and reception system comprising a transmitter for transmission of pulsed radio frequency signals and of relatively wideband signals during periods between pulses of the radio frequency signals, a receiver for receiving radio frequency signals, and a feedback circuit for combining output signals from the receiver with signals for transmission by the transmitter, the feedback circuit including means to adaptively modify wideband signals in the signals for transmission for rendering the receiver substantially insensitive to received signals derived from the transmitter.

The means to adaptively modify may be an adaptive transversal filter.

The radio frequency transmission and reception system may be a radio frequency repeater arranged to produce a transmitted pulse in response to each received pulse.

In order that the invention may be carried readily into effect an embodiment thereby is now described, by way of example only, by reference to the only FIGURE of the drawings which shows an active decoy in block schematic form.

Referring now to the FIGURE the active decoy comprises a receiver 10 connected to a receive antenna 11, a transmitter 12 connected to a transmit antenna 13 and a signal processing circuit 14 connected between the transmitter and the receiver. In operation, the processing circuit 14 initiates the transmission by the transmitter 12 of a transmitted pulse in response to a pulse received from a remote radar by the receiver 10, thereby to simulate reflection at a real target.

However, as described hereinbefore, the receiver 10 is also sensitive to signals derived from the transmitter itself, these signals being received either by direct transmission from the antenna 13 to the antenna 11 or by reflection at objects in the local environment, illustrated schematically as path 16 in the FIGURE, or by way of leakage paths in the system, shown as path 18. These unwanted signals are problematical since they then to blind the receiver 10 to genuine signals from a remote radar.

In accordance with the present invention additional circuits are provided in order to adaptively compensate for the unwanted signals. To that end, relatively wideband signals from a wideband, noise source 20 are transmitted only during the "quiet" periods between successive radio frequency pulses, and a feedback circuit 21 routes a portion of the transmitted wideband signals to a subtraction circuit 22 for combination with received signals from the receiver 10. The feedback circuit includes an adaptive transversal filter 23 which is adjusted adaptively to obtain a null at the output of the subtraction circuit 22. Since, during these "quiet" periods, any signal received by the receiver 10 will consist entirely of signals derived from the transmitter 12, the system is made substantially insensitive to such signals.

Since, in general, the characteristics of the leakage and reflection paths 16, 18 change relatively slowly, typically over the period of a millisecond or more, whereas a received radar pulse lasts for a much shorter period, typically of the order of a microsecond, it is desirable that the adaptive transversal filter 23 should operate with a relatively long time constant thereby to prevent cancellation of a received radar pulse. Alternatively, especially if the radar pulses last for longer periods, operation of the adaptive transversal filter 23 may be halted temporarily whenever a received pulse is detected.

If desired, the decoy may incorporate digital circuitry for improved performance and flexibility and, as shown in the FIGURE, respective conversion circuits 25, 27 are provided on downstream side of the receiver and on the upstream side of the transmitter. The adaptive filter may be used either in an analogue mode as shown by the broken line interconnections 29 or in a digital mode as shown by the solid line interconnections 31.

Although the present invention has been described with respect to a particular embodiment it should be realized that modifications may be effected whilst remaining within the scope of the invention.

We claim:

1. A radio frequency transmission and reception system comprising a transmitter for transmission of radio frequency signals in the form of pulses, the pulses having at least one pulse duration,
and of relatively wideband signals during periods between pulses of the radio frequency signals, a receiver for receiving radio frequency signals in the form of pulses and having at least one pulse duration, and a feedback circuit for combining output signals from the receiver with signals for transmission by the transmitter, the feedback circuit including means to adaptively modify wideband signals in the signals for transmission over a time period having a duration substantially in excess of the pulse duration of the pulses of the signals received by the receiver for rendering the receiver substantially insensitive to received signals received thereby directly and or indirectly from the transmitter.

2. A system according to claim 1 wherein the means to adaptively modify the wideband signals in the signals for transmission comprises an adaptive transversal filter.

3. A system according to claim 1 arranged for operation as a radio frequency repeater wherein, for radio frequency signals received by the receiver comprising pulsed signals, the transmitter is arranged to provide a pulse for transmission in response to each pulse received by the receiver.

4. A system according to claim 3 wherein the means to adaptively modify the wideband signals in the signals for transmission is arranged to operate with a time constant of substantially long period in comparison to the period of the pulsed signals received by the receiver.

5. A system according to claim 3 wherein operation of the means to adaptively modify the wideband signals in the signals for transmission is inhibited when a pulsed signal is received by the receiver.

6. A system according to claim 1 wherein the feedback circuit is arranged to operate in a digital mode, the system further comprising an analogue to digital converter for digitising output signals from the receiver and a digital to analogue converter for converting to analogue form the signals for transmission by the transmitter.

* * * * *